June 28, 1938.  L. S. NERGAARD  2,122,262
VACUUM THERMOCOUPLE
Filed June 24, 1936
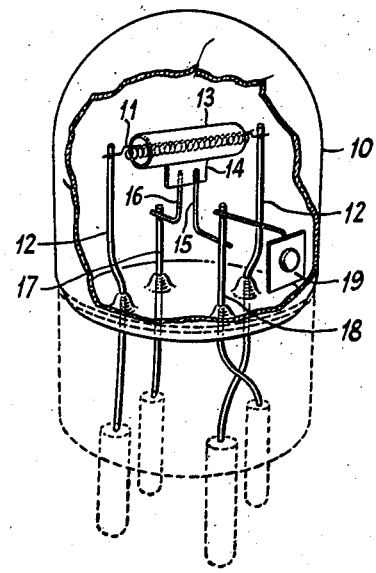
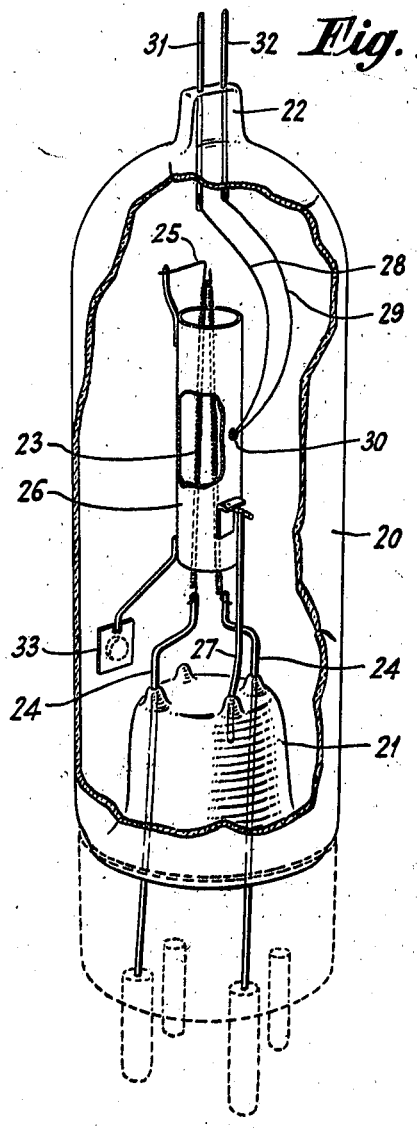
INVENTOR
LEON S. NERGAARD
BY
Charles McClain
ATTORNEY Patented June 28, 1938

2,122,262

UNITED STATES PATENT OFFICE 2,122,262

VACUUM THERMOCOUPLE

Leon S. Nergaard, East Orange, N. J., assignor, by mesne assignments, to Radio Corporation of America, New York, N. Y., a corporation of Delaware Application June 24, 1936, Serial No. 86,951

4 Claims. (Cl. 136—4)

My invention relates to devices for measuring power at ultra-high frequencies, more particularly to vacuum thermocouples.

It has been found that the most satisfactory device for measuring power at ultra-high frequencies is a vacuum thermocouple, having a heater to dissipate the power being measured and a thermocouple, the junction of which is exposed to the heater. For measuring power outputs of less than 100 milliwatts, little difficulty is experienced in designing such thermocouples in which the calibration is independent of the frequency and in which the resistance is sufficiently high to provide a satisfactory measuring device.

When, however, the power measured exceeds 100 milliwatts it becomes difficult to make a thermocouple having the necessary desirable characteristics of high resistance and stable calibration independent of the frequency to be measured. To dissipate the power being measured without burning out, the heater must be short and of large diameter. When this is done the resistance of the heater becomes so low that an appreciable fraction of the power is dissipated in the circuit resistances instead of in the heater; or if the heater is made long and of small diameter to provide the necessary resistance the current is no longer uniform throughout the heater and the junction of the thermocouple rises to a temperature depending on the power dissipated in its immediate vicinity and not on the total power dissipated in the heater. The high frequency calibration will then differ considerably from the low frequency calibration.

It is an object of my invention to provide a device of the thermocouple type, for measuring high power outputs at ultra-high frequencies, the calibration of which is independent of frequency and the resistance of which is sufficiently high to prevent dissipation of power in circuit resistance other than the heater.

The novel features which I believe to be characteristic of my invention are set forth with particularity in the appended claims, but the invention itself will best be understood by reference to the following description taken in connection with the accompanying drawing in which Figure 1 is a perspective of one form of device for measuring power outputs at ultra-high frequencies and made according to my invention, and Figure 2 is a perspective view of a modification of the device shown in Figure 1.

In Figure 1 the evacuated envelope 10 contains heater 11 in which the power to be measured is dissipated. This heater is supported on the leads 12—12. This heater is preferably of tungsten. Surrounding the heater is a shield or heat-absorbing member 13 which may be of nickel and is provided with a downwardly extending flange or rib 14 to which one end of each of the conductors 15 and 16 of the thermocouple is connected. These conductors may be of nickel and iron, for example, and are supported on the leads 17 and 18 extending through and sealed into the envelope. The thermocouples 15 and 16 and lead-in conductors 17 and 18 provide the support for the shield 13.

In one example of my invention, the heater wire comprises two mil tungsten in the form of a helical coil wound on a 15 mil mandrel, the length of the spiral being 1.5 centimeters. The shield is made of 5 mil nickel in the form of a cylinder, the inside diameter being 3 millimeters and the length 1 centimeter. The thermocouple comprises an iron wire and a nickel wire each 10 mils in diameter connected to the shield. The heater leads may be made of 40 mil Dumet. A conventional getter 19 may be used.

In a device made according to my invention the heater is both sufficiently long and of small enough diameter to dissipate power and have a sufficiently high resistance for doing this. The shield, of good thermal conductivity, absorbs substantially all the radiated heat from the heater. Because of its high thermal conductivity, the shield comes to a uniform temperature depending on the total power dissipated within the shield and the temperature of the surrounding space into which the shield reradiates the energy. Thus the temperature of the shield is independent of the current distribution on the heater wire. Since the junction of the thermocouple is connected to the outside of the shield, the thermocouple serves to measure the temperature of the shield and hence the power dissipated in the shield. Since the shield is also an electrical shield, the heater and the junction circuits of the thermocouple have very small mutual coupling. These thermocouples have been used at ultra-high frequencies and have been found very useful where accurate measurements are necessary. The calibration of this device is independent of frequency, and is capable of measuring high power outputs.

In the modification shown in Figure 2 the evacuated envelope 20 is provided with a reentrant portion 21 and press 22. The V-shaped filament heater 23 is connected at its lower ends to lead-ins 24 and supported at the upper end by resilient hook member 25 mounted at the top of the metallic tubular shield member 26, supported in turn by the shield support 27 embedded in the press of the re-entrant stem 21. A pair of thermocouple wires 28 and 29 have their junction 30 secured to the sleeve and are provided with lead-ins 31 and 32 extending through press 22 of envelope 20. This form of my invention has the same advantages as pointed out in connection with the form shown in Figure 1. A conventional getter 33 may be used.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

I claim:

1. A device for measuring power at high frequencies and comprising an evacuated envelope containing a heater to be connected to the source of power to be measured, hollow metallic means of thin sheet metal surrounding said heater for absorbing the radiated heat from said heater and having a high conductivity whereby the temperature of the hollow metallic heat absorbing means is uniform throughout its mass, and a thermocouple having its junction connected to the hollow metallic heat absorbing means.

2. A device for measuring power at high frequencies and comprising an evacuated envelope containing a tubular metallic shield of thin sheet metal, a heater within said shield and a pair of conductors comprising different metals each joined at one end to the outside of said shield.

3. A device for measuring power at high frequencies and comprising an evacuated envelope containing a tubular shield provided with an external longitudinal rib, a heater within said shield, a pair of conductors comprising different metals each having one end connected to said rib and lead-ins for supporting said heater shield and conductors.

4. A device for measuring power at high frequencies and comprising an evacuated envelope, a tubular metallic member supported within said envelope and having at one end a resilient hook, a filament type heater within said tubular metallic member and supported at one end from said hook, and a pair of lead-ins for supporting said heater at its other end, and a pair of conductors of different metals joined together at one end and connected to the outer side of said tubular metallic member, and lead-in conductors connected at the free ends of the conductors and extending through the envelope of said tube.

LEON S. NERGAARD.